United States Patent [19]

Hager et al.

[11] Patent Number: 5,621,061

[45] Date of Patent: Apr. 15, 1997

[54] PROCESS FOR STABILIZING ORGANOPOLYSILOXANES

[75] Inventors: Rudolf Hager, Altoetting; Rudolf Braun, Kastl; Otto Schneider; Bernward Deubzer, both of Burghausen, all of Germany

[73] Assignee: Wacker-Chemie GmbH, Munich, Germany

[21] Appl. No.: 726,850

[22] Filed: Oct. 4, 1996

Related U.S. Application Data

[63] Continuation of Ser. No. 479,738, Jun. 7, 1995, abandoned.

[30] Foreign Application Priority Data

Jun. 29, 1994 [DE] Germany .................. 44 22 813.9

[51] Int. Cl.$^6$ .................................................. C08G 77/08
[52] U.S. Cl. .................................................. 528/21; 528/23
[58] Field of Search .................................... 528/21, 23

[56] References Cited

U.S. PATENT DOCUMENTS

| | | | |
|---|---|---|---|
| 3,330,388 | 7/1967 | Stein | 190/48 |
| 3,398,176 | 8/1968 | Nitzsche et al. | 260/448.2 |
| 3,839,388 | 10/1974 | Nitzsche et al. | 260/448.2 |
| 4,460,726 | 7/1984 | Huber et al. | 524/114 |
| 4,564,693 | 1/1986 | Riederer | 556/401 |
| 4,599,437 | 7/1986 | Riederer | 556/462 |
| 4,661,612 | 4/1987 | George et al. | 556/450 |
| 4,683,277 | 7/1987 | Maxson | 528/21 |
| 4,701,490 | 10/1987 | Burkhardt et al. | 524/425 |
| 4,888,405 | 12/1989 | Gamon et al. | 528/23 |
| 4,975,510 | 12/1990 | Wegehaupt et al. | 528/21 |
| 5,017,640 | 5/1991 | Lebrun et al. | 524/588 |
| 5,210,129 | 5/1993 | de la Croi Habimana et al. | 524/731 |
| 5,210,131 | 5/1993 | Gilson et al. | 524/863 |
| 5,380,902 | 1/1995 | Hager et al. | 556/426 |
| 5,424,385 | 6/1995 | Hager et al. | 528/28 |

FOREIGN PATENT DOCUMENTS

| | | |
|---|---|---|
| 0117503 | 5/1987 | European Pat. Off. . |
| 0311766 | 4/1989 | European Pat. Off. . |
| 859672 | 10/1952 | Germany . |
| 3428581 | 2/1986 | Germany . |
| 3441353 | 5/1986 | Germany . |
| 3533028 | 3/1987 | Germany . |
| 3725377 | 2/1989 | Germany . |
| 3742069 | 6/1989 | Germany . |
| 4205201 | 8/1992 | Germany . |
| 4317909 | 12/1994 | Germany . |
| 4317978 | 12/1994 | Germany . |
| 1049188 | 11/1966 | United Kingdom . |

OTHER PUBLICATIONS

Database WPI Week 8049, Derwent Publications Ltd., London, GB; AN 80–87296c.
Chemical Abstract of DE 37 25 377, Feb. 1989.

*Primary Examiner*—Margaret W. Glass

[57] ABSTRACT

The invention relates to a process for stabilizing organopolysiloxanes which contain phosphazenes and/or their reaction products which promote the condensation and/or equilibration of organopolysiloxanes. To stabilize any previously known organopolysiloxanes which contain phosphazenes and/or their reaction products against re-arrangements and also molecular weight changes and viscosity changes resulting therefrom, it is proposed that the said phosphorus compounds be brought into contact with at least one non-basic, solid adsorbent.

9 Claims, No Drawings

PROCESS FOR STABILIZING ORGANOPOLYSILOXANES

This is a continuation of application Ser. No. 08/479,738 filed on Jun. 7, 1995, now abandoned.

FIELD OF THE INVENTION

The present invention relates to a process for stabilizing organopolysiloxanes which have been prepared by condensation and/or equilibration of organosilicon compounds containing Si-bonded oxygen in the presence of phosphazenes or their reaction products, wherein these are brought into contact with adsorptive solids.

BACKGROUND OF INVENTION

Organopolysiloxanes which have been prepared by condensation and/or equilibration of organosilicon compounds containing Si-bonded oxygen in the presence of phosphazenes as catalysts generally change their molecular weight during storage, and thus change their viscosity, if the phosphazenes are not deactivated or removed after the reaction. For example, U.S. Pat. No. 3,398,176 (issued on Aug. 20, 1968, Wacker-Chemie GmbH) discloses the deactivation of phosphazenes, described as phosphonitrilic chlorides, by reaction with tertiary mines. DE-A 34 28 581 (laid open on Feb. 13, 1986, Wacker-Chemie GmbH) describes the stabilization with basic lithium compounds, such as lithium hydroxide or lithium siloxanolates, of organopolysiloxanes prepared using phosphazenes. DE-A 37 42 069 (laid open on Jun. 22, 1989, Wacker-Chemie GmbH) is an example of the numerous patents describing deactivation of phosphazene catalysts using silazanes, e.g., hexamethyldisilazane or 1,3-divinyl-1,1,3,3-tetramethyldisilazane. A further method of stabilizing organopolysiloxanes which have been prepared using phosphazene catalysts is reaction with oxides, hydroxides or carbonates of divalent and trivalent metals, e.g., magnesium oxide, which is described in DE-A 35 33 028 (laid open on Mar. 19, 1987, Wacker-Chemie GmbH). EP-B 0 117 503 (published on May 13, 1987, Wacker-Chemie GmbH) discloses deactivation of phosphazene catalysts using epoxides.

In the processes mentioned for stabilizing organopolysiloxanes prepared using phosphazenes or phosphonitrilic chlorides, use is made of compounds which react with the acid catalysts. With the exception of the neutral epoxides, these are all basic substances. In most processes, the reaction products of phosphazene catalyst and deactivation agent remain completely or partially in the organopolysiloxanes, only in the process described in DE-A 35 33 028 are they removed.

SUMMARY OF INVENTION

The present invention provides a process for stabilizing organopolysiloxanes which contain phosphazenes and/or their reaction products which promote the condensation and/or equilibration of organopolysiloxanes, which comprises bringing the specified phosphorus compounds into contact with at least one non-basic solid adsorbent.

According to the process of the invention, any previously known organopolysiloxanes containing phosphazenes and/or their reaction products can be stabilized against rearrangements and also molecular weight changes and viscosity changes resulting therefrom.

The organopolysiloxanes which are stabilized according to the invention are preferably those of the formula $$X(SiR_2O)_nSiR_2X \quad (I),$$

where

R is identical or different and is a hydrogen atom or a SiC-bonded, monovalent, unsubstituted or substituted hydrocarbon radical, with the proviso that each silicon atom has at most one Si-bonded hydrogen atom, X is identical or different and is a hydroxyl group, chlorine or the group —$OSiR_aR^1_{3-a}$ where R has one of the meanings given above, $R^1$ is a monovaient, unsubstituted or substituted hydrocarbon radical bonded to silicon via oxygen and a is 0, 1, 2 or 3 and n is an integer of at least 4.

Although not shown by the frequently used formula, up to 5 mole % of the diorganosiloxane units can be replaced by other siloxane units but usually only those present as impurities which are more or less difficult to avoid, such as $RSiO_{3/2}$ and/or $SiO_{4/2}$ units, where R is as defined above.

Examples of radicals R are alkyl radicals such as the methyl, ethyl, n-propyl, isopropyl, n-butyl and sec-butyl radical, alkenyl radicals such as the vinyl and the allyl radical, aryl radicals such as the phenyl radical, alkaryl radicals such as tolyl and xylyl radicals, and aralkyl radicals such as the benzyl radical.

Examples of monovalent, substituted hydrocarbon radicals R are cyanoalkyl radicals such as the β-cyanoethyl radical, haloalkyl radicals such as the 3,3,3-trifluoropropyl radical, and haloaryl radicals such as o-, m- and p-chlorophenyl radicals.

Owing to their ready availability, at least 50% of the number of the radicals R are preferably methyl radicals, with the remaining radicals R preferably being vinyl and/or phenyl radicals. In addition, the presence of Si-bonded hydrogen can also be preferred.

Examples of radicals $R^1$ are the methoxy, ethoxy and methoxyethyleneoxy radical ($CH_3OCH_2CH_2O$—) and also phenoxy radicals substituted by radicals R.

The viscosity of the organopolysiloxanes against changes in which the organopolysiloxanes can be stabilized is preferably from 2 to 10,000 $mm^2/s$ at a temperature of 25° C., more preferably from 10 to 5,000 $mm^2/s$.

The process of the invention has the greatest importance for those organopolysiloxanes of formula (I) where X is a hydroxyl group or a radical of the formula —$OSiR_3$, such as the trimethylsiloxy, dimethylvinylsiloxy or dimethylhydrogensiloxy radical, or where some of the radicals X are hydroxyl groups and the remaining X radicals have the formula —$OSiR_3$.

According to the process of the invention, one type of organopolysiloxane or a mixture of organopolysiloxane can be stabilized.

The phosphazenes present in the organopolysiloxanes which are stabilized according to the invention against viscosity changes can be any phosphazenes which have previously been used for promoting condensation and/or equilibration of organosilicon compounds containing Si-bonded oxygen.

Examples of such phosphazenes are those which are obtainable by reaction of 2 mole of phosphorus pentachloride with 1 mole of ammonium chloride, as disclosed, for example, in U.S. Pat. No. 3,839,388 (issued on Oct. 1, 1974, Wacker-Chemie GmbH), or those as described in German application No. P 43 17 909.6 (corresponding U.S. Pat. No.

5,380,902, issued on Jan. 10, 1995 Wacker-Chemie GmbH) or silicon-containing phosphazenes as disclosed in DE-A 37 25 377 (laid open on Feb. 9, 1989, Wacker-Chemie GmbH) and the German Application No. P 43 17 978.9 filed on May 28, 1993 (corresponding to U.S. Pat. No. 5,424,385, issued Jun. 13, 1995, Wacker-Chemie GmbH).

Whether the organopolysiloxanes prepared by phosphazene-promoted condensation and/or equilibration still contain mostly unchanged phosphazenes or predominantly reaction products of the phosphazenes with the siloxanes, siloxanols or secondary constituents, for example water, depends on the type of the phosphazenes used, the type of the siloxane starting compounds and on the reaction conditions.

A precise description of such reaction products is generally not possible. Fundamentally, the reaction products possess an ability to promote condensation and/or equilibration reactions of organopolysiloxanes which is comparable to that of the phosphazenes originally used.

The preparation of organopolysiloxanes containing phosphazenes and their reaction products which likewise promote condensation and/or equilibration is generally known and described in, for example, the above mentioned U.S. Pat. No. 3,330,388, DE-A 42 05 201 (laid open on Aug. 27, 1992, Dow Corning S.A.), U.S. Pat. No. 5,210,129 (issued on May 11, 1993, Dow Corning S.A.), the above-cited German Applications P 43 17 909.6 and P 43 17 978.9.

The organopolysiloxanes which are stabilized by the process of the invention contain phosphazenes and/or their reaction products in amounts of preferably from 1 to 500 ppm by weight, more preferably from 3 to 200 ppm by weight, based on the total weight of the organopolysiloxanes containing phosphorus compounds.

In the process of the invention, the non-basic adsorbents used are preferably activated carbons, carbon blacks, silica gels, Fuller's earths, talc, glass powder and zeolites, with activated carbon being more preferred.

The adsorbent used according to the invention can be a single type or a mixture of various types of such adsorbents.

When the specified phosphorus compounds come into contact with the adsorbents, they have only a reduced promoting effect, if any, on the condensation and/or equilibration of organosilicon compounds.

The process of the invention can be carried out batchwise or continuously or semicontinuously.

In the process of the invention, the organopolysiloxanes which contain phosphorus compounds and are to be stabilized can be brought into contact with the adsorbents in various ways.

Process variant A

In this process variant, the organopolysiloxanes which contain phosphorus compounds and are to be stabilized are treated with the adsorbents, the adsorbents are mixed, preferably homogeneously, with the organopolysiloxanes by stirring, and the adsorbents loaded with phosphorus compound are subsequently separated off from the organopolysiloxanes.

The contact time of the organopolysiloxanes to be stabilized with the adsorbents, i.e., the time from the addition of adsorbent until the adsorbents loaded with phosphorus compound are separated off, is preferably from 5 minutes to 5 hours, more preferably from 10 minutes to 3 hours.

The adsorbents loaded with phosphorus compound are preferably separated off by filtration or centrifugation.

The organopolysiloxanes treated in this way are virtually free of phosphazenes and their reaction products.

The adsorbents used have a particle diameter of preferably from 1 μm to 5 mm, more preferably from 20 μm to 1 mm. The adsorbents used according to the invention have a specific surface area of preferably at least $10^4$ m$^2$/kg, more preferably at least $10^5$ m$^2$/kg, measured by the BET method.

In the process variant A of the invention, the adsorbents are preferably used in amounts of from 0.005% to 5% by weight, more preferably from 0.01% to 2% by weight, based on the total weight of the organopolysiloxanes containing phosphorus compounds.

The process variant A of the invention is preferably carried out at a temperature of from 0° to 200° C., in particular from room temperature to 120° C., and at a pressure of preferably from 900 to 1100 hPa. However, it is also possible to use higher or lower pressures.

Process variant B

In this process variant, the organopolysiloxanes which are to be stabilized and contain phosphorus compounds are filtered through a filter bed which contains an adsorbent or is covered by an adsorbent. The organopolysiloxanes treated in this way are then likewise free of phosphazene constituents.

The adsorbent used in this variant can be any of the above mentioned adsorbents.

The amount of adsorbent on the filter is preferably from 0.01 to 10 g/m$^2$, more preferably from 0.1 to 5 g/m$^2$.

In the process variant B of the invention, the filter used preferably contains adsorbents in amounts of from 0.01% to 5% by weight, more preferably from 0.05% to 2% by weight, based on the total weight of the organopolysiloxanes containing phosphorus compounds.

The process variant B of the invention is preferably carried out at a temperature of from 0° to 200° C., in particular from room temperature to 120° C.

The process of the invention, i.e., both process variant A and process variant B, have the great advantage that virtually complete removal of the phosphazenes and their reaction products which likewise promote condensation and/or equilibration from organopolysiloxanes is made possible in a simple and very gentle manner, without use of basic substances or other substances which react with the phosphazenes. The stabilization process of the invention has the further advantage that no changes occur in the organopolysiloxane under the action of the adsorbent.

The organopolysiloxanes stabilized according to the invention can be used for all purposes for which the organopolysiloxanes stabilized by processes previously known were used, such as for personal care products and cosmetic formulations, as thread lubricants, for preparing organopolysiloxane elastomers and producing non-stick coatings. In addition, the organopolysiloxanes stabilized according to the invention are suitable as tranformer oils, electrically insulating oils and as starting materials for electrically insulating silicone rubber, for example in electrical engineering.

In the following examples, all parts and percentages are by weight unless otherwise indicated. If not otherwise indicated, the following examples are carried out at the pressure of the surrounding atmosphere at about 1000 hPa, and room temperature, at about 20° C., or at the temperature which becomes established on combining the reactants at room temperature without additional heating or cooling.

All viscosities given below are at a temperature of 25° C.

EXAMPLE 1

A mixture of 208 g (1 mole) of PCl$_5$ and 26.7 g (0.5 mole) of NH$_4$Cl in 160 ml of 1,2,3-trichloropropane was stirred for 5 hours at 155° C. After cooling to room temperature, 7.5 ml of water were metered into the pale yellow solution over a period of 2 hours. The volatile constituents were subsequently removed at a maximum of 100° C. and a pressure of 1 hPa. The remaining residue is 95 g of a yellow-brown oily liquid having a density of 1.8 g/ml and consisting essentially of the compounds $PCl_3=N—PCl_2=N—PCl_2O$ and $PCl_3=N(—PCl_2=N)_2—PCl_2O$. To be able to measure the small amounts used exactly, a 10% strength solution of this phosphazene mixture in ethyl acetate was prepared.

In a flask fitted with stirrer, 240 g of α,ω-bis(trimethylsiloxy)polymethylhydrogensiloxane having a viscosity of 25 mm$^2$/s and 100 g of α,ω-bis(trimethylsiloxy)polydimethylsiloxane having a viscosity of 350 mm$^2$/s are admixed at 120° C. with 0.35 ml of the above described phosphazene solution and stirred for 10 minutes at this temperature.

After cooling to room temperature, 1 g of activated carbon having a specific surface area (according to BET) of 800 m$^2$/g (commercially available under the designation "activated carbon, pure" from Merck-Schuchardt) is stirred into the reaction mixture. After 30 minutes from the time of activated carbon addition, the mixture is filtered through a glass frit having a diameter of 6.5 cm. The organopolysiloxane thus obtained is a colorless, clear oil having a viscosity of 35 mm$^2$/s and has the average composition $Me_3Si[OSiMe_2]_{35}[OSiMeH]_{150}OSiMe_3$. The product is pH-neutral and its viscosity does not change even on heating at 180° C. for one hour.

To determine the phosphorus content, 100 g of organopolysiloxane were intensively mixed with 100 ml of deionized water for 1 hour at 80° C. The phases were subsequently separated and the aqueous phase was analyzed by ICP/AES (atomic emission spectroscopy). The phosphorus content is below the detection limit of 0.2 mg/kg of test substance.

EXAMPLE 2

A mixture of 1000 g of an α,ω-dihydroxypolydimethylsiloxane having a viscosity of about 120 mm$^2$/s and 125 g of an α,ω-divinylpolydimethylsiloxane having a viscosity of 30 mm$^2$/s is admixed at 120° C. with 0.15 ml of the phosphazene solution described in Example 1. The pressure in the reaction vessel is subsequently reduced to 1 hPa and the mixture is stirred for 30 minutes under these conditions. The heating source is now removed and the pressure in the reaction vessel is again brought to the ambient atmospheric pressure.

As soon as the reaction mixture has cooled to a temperature of about 50° C., it is filtered through a glass frit having a diameter of 6.5 cm and covered with about 0.1 g of activated carbon having a specific surface area (according to BET) of 800 m$^2$/g (commercially available under the designation "activated carbon, pure" from Merck-Schuchardt) per cm$^2$ of filter area. The filtrate is an α,ω-divinylpolydimethylsiloxane having a viscosity of 880 mm$^2$/s. It is clear, pH-neutral and its viscosity does not change on heating at 180° C. for one hour.

Using the procedure described in Example 1, the phosphorus content was then determined by means of ICP/AES. The phosphorus content is below the detection limit of 0.2 mg/kg of the test substance.

EXAMPLE 3

In a flask fitted with stirrer, 1200 g of α,ω-bis(trimethylsiloxy)polymethylhydrogensiloxane having a viscostiy of 25 mm$^2$/s and 500 g of α,ω-bis(trimethylsiloxy)polymethylsiloxane having a viscosity of 350 mm$^2$/s are admixed at 120° C. with 1.75 ml of the phosphazene solution described in Example 1 and the mixture is stirred for 10 minutes at this temperature.

After cooling to room temperature, the organopolysiloxane thus obtained, which has the average composition $Me_3Si[OSiMe_2]_{35}[OSiMeH]_{150}OSiMe_3$, is filtered in four fractions of 300 g each through a glass frit having a diameter of 6.5 cm and which has previously been covered with 1 g of activated carbon having a specific surface area (according to BET) of 800 m$^2$/s (commercially available under the designation "activated carbon, pure" from Merck-Schuchardt).

After filtration of each fraction, the phosphorus content and the acid content of the respective fraction is determined. The results are shown in Table 1. The phosphorus content (given in ppm, i.e., mg of phosphorus per kg of siloxane) was determined by means of ICP/AES spectroscopy using the procedure described in Example 1. The acid content was determined by titration with sodium hydroxide solution, with the value in ppm (mg of HCl/kg of siloxane) being calculated as follows:

TABLE 1

$$\text{acid content (ppm)} = \frac{\mu eq \text{ of NaOH} \times 36.46}{\text{sample weight of siloxane (g)}}$$

| Fraction | Acid Content (ppm) | Phosphorous conent (ppm) |
| --- | --- | --- |
| 1 | 0 | <0.2 |
| 2 | 0 | <0.2 |
| 3 | 1.6 | 1.2 |
| 4 | 2.2 | 1.7 |

Under the conditions selected in Example 3, 1 g of activated carbon is sufficient to completely, or at least almost completely, remove the phosphazenes or their reaction products from more than 600 g of the organopolysiloxane.

EXAMPLE 4

The reaction of 1200 g of α,ω-bis(trimethylsiloxy)polymethylhydrogensiloxane, 500 g of α,ω- bis(trimethylsiloxy)polydimethylsiloxane and 1.75 ml of the phosphazene solution was, using the procedure described in Example 3, repeated a total of three times and the product batches were subsequently combined. In fractions of 500 g each, the organopolysiloxane thus obtained, which has the average composition $Me_3Si[OSiMe_2]_{35}[OSiMeH]_{150}OSiMe_3$, is filtered through an activated carbon-containing deep-bed filter having a diameter of 14 cm (commercially available under the designation "Seitz-Tiefenfilter AKS4-14D" from Seitz).

After filtration of each fraction, the phosphorus content and the acid content of the respective fraction is determined as described in Example 3. The results are shown in Table 2.

TABLE 2

| Fraction | Acid Content (ppm) | Phosphorus content (ppm) |
| --- | --- | --- |
| 1 | 0 | <0.2 |
| 2 | 0 | <0.2 |
| 3 | 0 | <0.2 |
| 4 | 0 | <0.2 |
| 5 | 1.8 | 1.4 |

Under the conditions selected in Example 4, no phosphazene constituents are detectable in the filtrate for as much as 2000 g of siloxane; only at 2500 g are traces of acid and phosphorus detected.

What is claimed is:

1. A process for stabilizing organopolysiloxanes containing phosphazenes and/or reaction products thereof which promote the condensation and/or equilibrium of said organopolysiloxanes by removing said phosphazenes and/or reaction products thereof from said organopolysiloxanes, said process comprising bringing said phosphazenes and/or reaction products thereof into contact with at least one non-basic solid adsorbent, said non-basic solid adsorbent comprising activated carbon, carbon black, or mixtures thereof, and separating said organopolysiloxane from said non-basic solid adsorbent, such that following said contact and said separating, the phosphazene content of said organopolysiloxanes expressed as phosphorus is less than about 0.2 mg phosphorus/Kg organopolysiloxanes.

2. The process as claimed in claim 1, wherein the organopolysiloxanes are those of the formula $$X(SiR_2O)_nSiR_2X$$

where

R is identical or different and is a hydrogen atom or a SiC-bonded, monovalent, unsubstituted or substituted hydrocarbon radical, with the proviso that each silicon atom has at most one Si-bonded hydrogen atom, X is identical or different and is a hydroxyl group, chlorine or the group $OSiR_aR^1{}_{3-a}$ where R is identical or different and is a hydrogen atom or a SiC-bonded, monovalent, unsubstituted or substituted hydrocarbon radical, with the proviso that each silicon atom has at most one Si-bonded hydrogen atom, $R^1$ is a monovalent, unsubstituted or substituted hydrocarbon radical bonded to silicon via oxygen and a is 0, 1 2 or 3 and n is an integer of at least 4.

3. The process as claimed in claim 1, wherein the non-basic adsorbents are activated carbons.

4. The process as claimed in claim 1, wherein said organopolysiloxanes containing phosphazenes and/or reaction products thereof are treated with the adsorbents and the adsorbents loaded with said phosphazenes and/or reaction products thereof are subsequently separated from the organopolysiloxanes.

5. The process as claimed in claim 4, wherein the adsorbents are used in amounts of from 0.005% to 5% by weight, based on the total weight of the organopolysiloxanes.

6. The process as claimed in claim 1, wherein said adsorbent is located in a filter bed containing said adsorbent or covered with said adsorbent.

7. The process as claimed in claim 6, wherein the adsorbent is present in an amount of from 0.1% to 5% by weight, based on the total weight of the organopolysiloxane containing phosphazenes and/or reaction products thereof.

8. In a process for the manufacture of organopolysiloxanes by the condensation and/or equilibration of organosilicon compounds in the presence of one or more phosphazene(s) as catalysts to form an organopolysiloxane containing phosphazenes and/or reaction products thereof, the improvement comprising:

removing phosphazenes and/or the reaction products thereof by contacting said organopolysiloxane containing phosphazenes and/or the reaction products thereof with from about 0.005 weight percent to about 5.0 weight percent based on the weight of the organopolysiloxane containing phosphazenes and/or the reaction products thereof of at least one non-basic adsorbent, said non-basic solid adsorbent comprising activated carbon, carbon black, or mixtures thereof, and separating said organopolysiloxane from said adsorbent; such that following said contacting and separating, the phosphazene content of said organopolysiloxanes expressed as phosphorus is less than about 0.2 mg phosphorus/Kg organopolysiloxane;

such that an organopolysiloxane of improved stability to change in molecular weight, equilibration, condensation, and/or viscosity relative to the same organopolysiloxanes containing phosphazenes and/or the reaction products thereof not contacted with said adsorbent is obtained.

9. The process of claim 8 wherein said phosphazenes and/or reaction products thereof are present in said organopolysiloxane prior to said contacting, in amounts of from 1 ppm to about 500 ppm based on the weight of said organopolysiloxane containing phosphazenes and/or reaction products thereof.

* * * * *

UNITED STATES PATENT AND TRADEMARK OFFICE
CERTIFICATE OF CORRECTION

PATENT NO. : 5,621,061
DATED : April 15, 1997
INVENTOR(S) : Rudolf Hager et al.

It is certified that error appears in the above-indentified patent and that said Letters Patent is hereby corrected as shown below:

Column 8, line 8 (Appln. page 2 (of the claims), line 10)), change "0.1%" to -- 0.01% --.

Signed and Sealed this

Twenty-seventh Day of October, 1998

Attest:

BRUCE LEHMAN

*Attesting Officer*     *Commissioner of Patents and Trademarks*